(12) United States Patent
Westman

(10) Patent No.: US 8,411,839 B1
(45) Date of Patent: Apr. 2, 2013

(54) SYSTEM AND METHOD FOR PROVIDING ENHANCED CLIENT SATISFACTION DURING PHONE INTERACTIONS BY INTELLIGENT AUTOMATIC CALL ROUTING

(75) Inventor: Michael Westman, San Antonio, TX (US)

(73) Assignee: Rackspace US, Inc., San Antonio, TX (US)

( * ) Notice: Subject to any disclaimer, the term of this patent is extended or adjusted under 35 U.S.C. 154(b) by 0 days.

(21) Appl. No.: 13/544,216

(22) Filed: Jul. 9, 2012

(51) Int. Cl.
*H04M 3/00* (2006.01)
*H04M 3/42* (2006.01)
*H04L 12/66* (2006.01)

(52) U.S. Cl. ......... 379/265.01; 379/265.02; 379/201.01; 379/201.03

(58) Field of Classification Search .......... 379/265.01–265.02, 201.01, 201.03; 370/352
See application file for complete search history.

(56) References Cited

U.S. PATENT DOCUMENTS

2011/0300879 A1* 12/2011 Braun ........................ 455/456.1

* cited by examiner

*Primary Examiner* — Rasha Al Aubaidi
(74) *Attorney, Agent, or Firm* — Daniel A. Rogers; William H. Quirk; Rosenthal Pauerstein Sandoloski Agather LLP

(57) ABSTRACT

A system and method for providing enhanced client satisfaction during phone interactions by intelligent automatic call routings to a relevant client support agent. The invention includes methods to automatically determine and anticipate client needs based on the information the host has about the client.

4 Claims, 2 Drawing Sheets

SYSTEM AND METHOD FOR PROVIDING ENHANCED CLIENT SATISFACTION DURING PHONE INTERACTIONS BY INTELLIGENT AUTOMATIC CALL ROUTING

BACKGROUND OF THE INVENTION

1. Field of the Invention

The present invention is directed generally to advancements in systems and methods for providing enhanced client satisfaction during phone interactions by intelligent automatic call routings to a relevant client support agent.

2. Description of Related Art

In this competitive business environment many companies have attempted to lower costs by offloading client and customer phone calls into automated touch tone query and response systems. This has become so prevalent that clients can often struggle to find a way through the telephone maze to contact a real life person. While these telephone mazes have cut costs of businesses, they have at the same time increased costs to clients in lost time and frustration in resolving client issues.

Currently, when a client calls a host, the client is usually presented with a list of touch tone options through which the client must navigate in order to be routed to a relevant client support agent. More often than not, clients are faced with multiple transfers and phone disconnects. They further are faced with the task of repeatedly restating the reason for their call to multiple agents before finally getting their concerns resolved. This process oftentimes leaves clients very dissatisfied. It costs businesses the goodwill of their clients as well as lost profits from clients who cancel their services. Therefore, there is a long felt need in the art for a system and method for providing enhanced client satisfaction during phone interactions by intelligent automatic call routings to a relevant client support agent.

SUMMARY OF THE INVENTION

The present invention is directed to a method and system for providing enhanced client satisfaction during phone interactions by intelligent automatic call routings to a relevant client support agent. The invention includes methods to automatically determine and anticipate client needs based on the information the host has about the client. For example, a client may have a payment overdue. The present invention would automatically recognize that such a client may want to speak with a billing or accounts receivable agent to resolve their overdue bill. Thus, in the present invention when a client picks up a telephone that is hotlined to the host, the client is automatically and directly connected to a billing agent. In another example, perhaps a client is experiencing a website outage. By picking up the hotlined handset, the host's system will automatically route the client to a technical support agent.

Many other objects, features, advantages, benefits, improvements and non-obvious unique aspects of the present invention, as well as the prior problems, obstacles, limitations and challenges that are addressed, will be evident to the reader who is skilled in the art, particularly when this application is considered in light of the prior art. It is intended that such objects, features, advantages, benefits, improvements and non-obvious unique aspects are within the scope of the present invention, the scope of which is limited only by the claims of this and any related patent applications and any amendments thereto.

To the accomplishment of all the above, it should be recognized that this invention may be embodied in the form illustrated in the accompanying drawings, attention being called to the fact, however, that the drawings are illustrative only, and that changes may be made in the specifics illustrated or described.

DETAILED DESCRIPTION OF PREFERRED EMBODIMENT

As previously stated, the present invention is directed to a method and system for providing enhanced client satisfaction during phone interactions by intelligent automatic call routings to a relevant client support agent. In this document the terms client includes, but is not limited to customers and consumers. Client refers to any person or organization with an interesting contacting a person or organization. The term host refers any company or organization that has an interest in contacting or being contacted by a client. The differentiating factor being a client and host is that the host runs and maintains the communication infrastructure.

Figure 1:
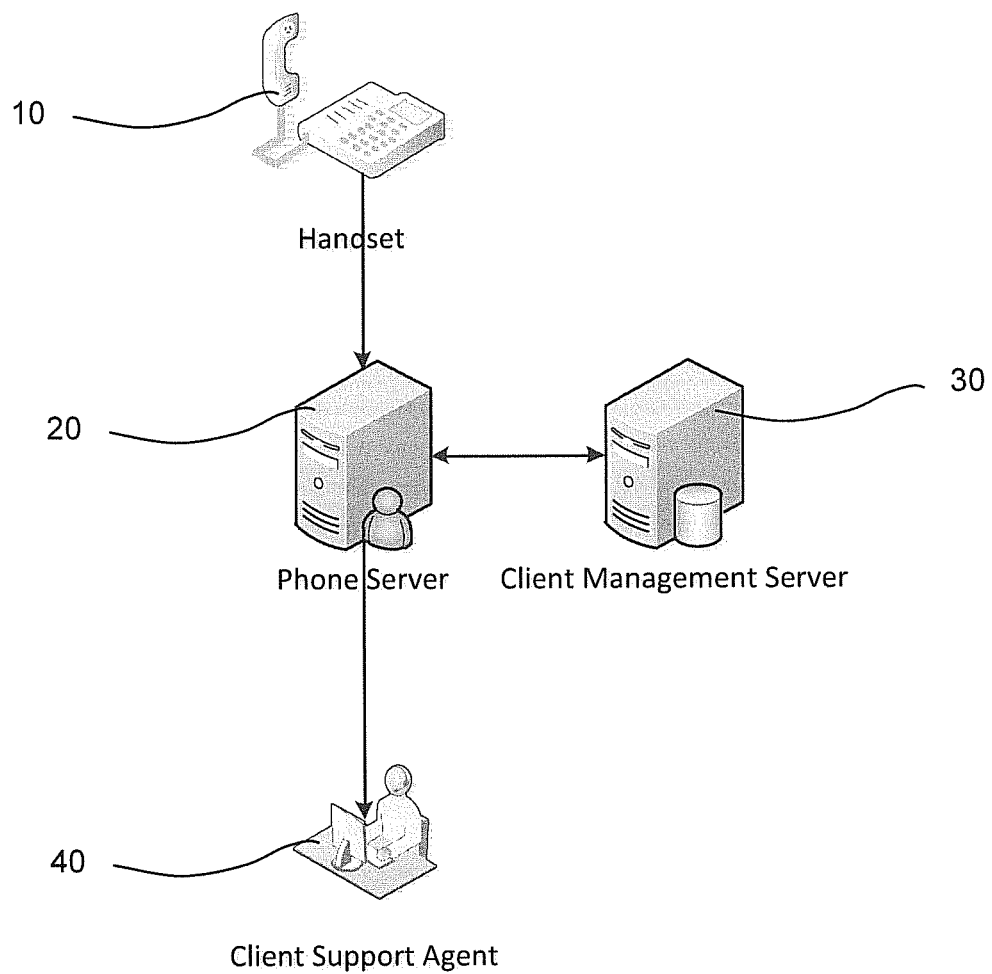
FIG. 1 is a high-level view of major components of a typical preferred embodiment of the present invention.
Figure 2:
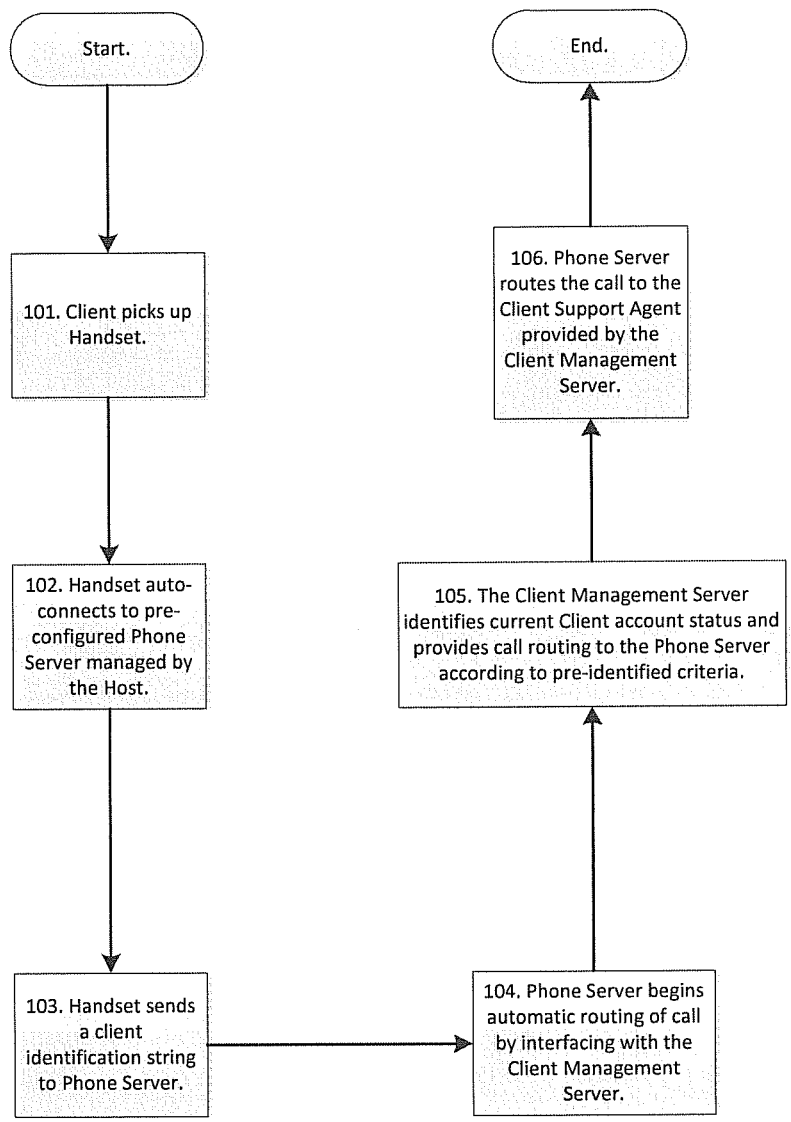
FIG. 2 is a flow diagram of a typical preferred embodiment of the present invention.

Turning to FIG. 1, which shows a high level view of a typical preferred embodiment of the present invention with all of its major components. Specifically, the host provides handset 10 to the client. The handset 10 is configured by the host to connect to a specific phone server 20 automatically when the client picks up the handset 10. Thus, a client has no need to dial any numbers to reach the host. In the preferred embodiment the handset 10 is an old styled desk telephone that has been modified to contain a voice over internet protocol (VoIP) analog telephone adapter (ATA). The ATA is configured to automatically connect to a VoIP phone server managed by the host.

The handset 10 is the client's lifeline to the host. It provides a physical embodiment of the host's dedication to customer service. It functions as a physical reminder of the host's dedication to the client. By using VoIP it also provides a benefit to the host by lowering the costs of traditional toll free support numbers. In the preferred embodiment, the handset 10 is "hotlined" to the host, meaning that there are no buttons to press or numbers to dial to initiate a call. All that is required is that the client lifts the handset. In alternate embodiments, client and host communication could be initiated by a simple button press on the handset 10 or other methods.

In alternate embodiments, the handset 10 could a VoIP app on a smartphone. In this embodiment the app would be set to auto connect to the host. Further alternates could include using Session Initiation Protocol (SIP) phones, h.232, GSM phones, public switched telephone network (PSTN) phones, or other wired, wireless, or cellular communications networks. In these embodiments, the common factor is that the handset 10 is configured by the host to automatically connect to a host specified phone server. In some embodiments, this configuration could be updated remotely by the host. In other embodiments, this configuration could require direct access to the handset 10.

The handset 10 connects automatically to the host specified phone server 20. The phone server 20 provides the routing and voice communication aspects of the present invention. It is the entry point for the handset 10 to the host and the entry point for the client to communicate with the host.

Upon connection to the phone server 20, the handset 10 provides a client identification string to the phone server 20. The phone server 20 uses this string to identify the specific client that has connected. In an alternate embodiment the phone server 20 uses caller ID, geo-location information, IP address, Automatic Number Identification (AIN) or other information to identify the client. These alternate methods could as be used to augment the client identification string in place of the client identification code.

The phone server 20 connects with the client management server 30. The client management server 30 is a database maintained by the host that contains relevant information on the client. For example, the client's billing account status, days overdue, technical support status, sales cart status, open or prior support ticket status, among other information is maintained by the client management server 30. The client management server 30 uses the client identification string to lookup the specific client's information.

The client management server 30 then applies intelligent logic to determine and anticipate why the client has called the host and identifies an appropriate client support agent 40 to handle the anticipated client needs. In the preferred embodiment the logic is predetermined by the host.

For example, a client may have a payment overdue. The present invention would automatically recognize that such a client may want to speak with a billing or accounts receivable agent to resolve their overdue bill. Thus, in the present invention when a client picks up the handset 10 from the client's perspective the client is automatically connected to a host billing agent. In another example, perhaps a client is experiencing a website outage. By picking up the handset 10, the host's system will automatically route the client to a technical support agent.

In alternate embodiments, machine learning and artificial intelligence could be applied to learn about likely client calls based on client information. In another embodiment, the host could implement an evolutionary algorithm that will through evolutionary feedback refine and hone logic based on the client for information. In this particular embodiment the client could, for example, provide feedback on how good the system determined the client's desired support contact. Overtime the evolutionary algorithm would learn to associate particular client information with particular support agents.

Finally, once the client management server 30 has determined the likely client support agent 40, the phone server 20 automatically connects the client to the identified client support agent 40 at the host. The logic and routing to the client support agent 40 happens automatically and nearly instantaneously. From the client's perspective, the client has picked up the handset 10 and nearly immediately is speaking to a relevant and live person that can resolve the client's concerns.

In some embodiments of the present invention, the method and systems described in are provided via computer software, either via the internet, via a stand-alone software application operating independently or in connection with other software systems, or some combination of the two. As well, embodiments may come in any known form and may also be implemented by hardware, software, scripting languages, firmware, middleware, microcode, hardware description languages, and/or any combination thereof. When implemented with coded programming, it should also be understood that the program code or code segments to perform the necessary steps or tasks of alternative embodiments may be coded in solid state or may be stored in a machine-readable medium such as a computer storage medium. A code segment or machine-executable step or instruction may represent a procedure, a function, a subprogram, a program, a routine, a subroutine, a module, a software package, a script, a class, or any combination of instructions, data structures, and/or program statements. Executable code segments may also be coupled to other code segments or to a hardware circuit by passing and/or receiving information, data, arguments, parameters, and/or memory contents, which may be passed, forwarded, or transmitted via any suitable means including memory sharing, message passing, token passing, network transmission, etc.

With reference again to FIG. 1, a particularly preferred embodiment is provided in the form of software that is installed and adapted to interact with the handset, servers and client support agents. It should be understood that the graphical representation of the system is an exemplary reference to any number of software systems that may be implemented by the present invention.

Specific details are given in the above description to provide a thorough understanding of various preferred embodiments. However, it is understood that these and other embodiments may be practiced without these specific details. For example, processes may be shown in block diagrams in order not to obscure the embodiments in unnecessary detail. In other instances, well-known processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have many additional steps not included in the figure. A process may correspond to a method, a function, a procedure, a subroutine, a subprogram, etc. When a process corresponds to a function, its termination corresponds to a return of the function to the calling function or the main function.

Embodiments of the invention may involve use middleware and/or other software implementation; the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may be downloadable through an internet connection service. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

While the principles of the disclosure have been described above in connection with specific apparatuses and methods, it is to be clearly understood that this description is made only by way of example and not as limitation on the scope of the disclosure. Whether now known or later discovered, there are countless other alternatives, variations and modifications of the many features of the various described and illustrated embodiments, both in the process and in the system characteristics, that will be evident to those of skill in the art after careful and discerning review of the foregoing descriptions, particularly if they are also able to review all of the various systems and methods that have been tried in the public domain or otherwise described in the prior art. All such alternatives, variations and modifications are contemplated to fall within the scope of the present invention.

Although the present invention has been described in terms of the foregoing preferred and alternative embodiments, these descriptions and embodiments have been provided by way of explanation of examples only, in order to facilitate understanding of the present invention. As such, the descriptions and embodiments are not to be construed as limiting the present invention, the scope of which is limited only by the claims of this and any related patent applications and any amendments thereto.

What is claimed is:

1. A method for providing enhanced client satisfaction during phone interactions by providing automatic, real time, logic based and client need intelligent call routing, said method comprising:
   a. providing a client with a specialized phone configured to automatically connect to a host phone server and provide client identification information;
   b. determining which client has called the host phone server and querying a client management database for information about current client status;
   c. determining and anticipating client needs based on predetermined criteria based upon said client status; and
   d. automatically routing said client to said relevant support contact based said determination of client needs.

2. A system for providing enhanced client satisfaction during phone interactions by providing automatic, real time, logic based and client need intelligent call routing, said system comprising:
   a. a specialized phone for providing a customized connection to a particular client support contact;
   b. said specialized phone configured to automatically connect to a host phone server when activated by a client;
   c. said specialized phone providing a customized identification string to said host phone server;
   d. a client management database;
   e. said client management database containing status information about said client as identified by the said identification string;
   f. a client routing logic switchboard;
   g. said host phone server querying said client routing logic switchboard; and
   h. said client routing logic switchboard querying said client management database and routing said customized connection to said particular client support contact based on a set of logic criteria.

3. The system of claim 2 wherein said specialized phone is a desk phone with a voice over internet protocol analog telephone adapter.

4. The system of claim 2 wherein said specialized phone is remotely configurable.

* * * * *